Sept. 8, 1970  E. W. SILVERTOOTH  3,527,526
CATOPTRIC IMAGE-FORMING SYSTEM IN WHICH LIGHT
IS REFLECTED TWICE FROM EACH SURFACE
Filed May 26, 1965
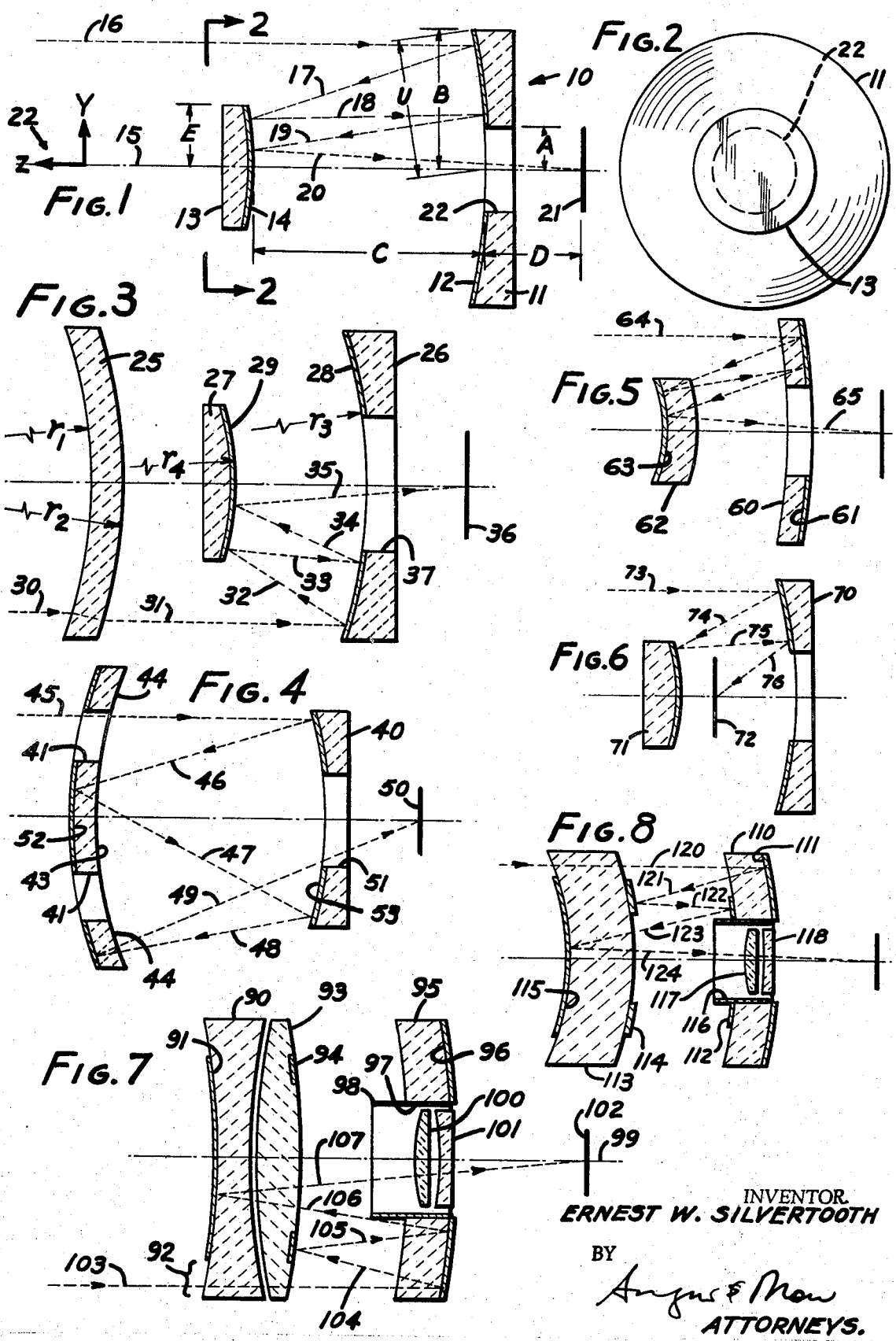
INVENTOR.
ERNEST W. SILVERTOOTH
BY
ATTORNEYS.

United States Patent Office 3,527,526
Patented Sept. 8, 1970

3,527,526
CATOPTRIC IMAGE-FORMING SYSTEM IN WHICH LIGHT IS REFLECTED TWICE FROM EACH SURFACE
Ernest W. Silvertooth, 974 Flintridge Ave., Pasadena, Calif. 91103
Filed May 26, 1965, Ser. No. 458,980
Int. Cl. G02b 17/06, 17/08
U.S. Cl. 350—294                    2 Claims

ABSTRACT OF THE DISCLOSURE

A self-baffling optical system of the Cassegrainian type, in which the rays are reflected twice from one or more of the reflecting surfaces, which may be either spherical or aspherical. Forms are shown with refracting elements in combination and on refracting elements, with the image plane either ahead of or behind the primary reflector, and in which the system may be focussed by moving elements axially with respect to each other. A specific example is disclosed having a particularly advantageous aspheric conformation according to the equation:

$$Z = A_1 U + A_2 U^2 + A_3 U^3 + A_4 U^4 + \ldots$$

where $U = Y^2 + Z^2$, U being the square of the chord from the midpoint of the mirror to the defined point, with specific values being listed for the constants $A_n$. A specific example of spherical conformation is also shown. A method is shown for producing aspheric reflecting surfaces on spherical substrates by first evaporating on a silver film of nonuniform thickness followed by an aluminum film of uniform thickness.

This invention relates to an optical system for the imagery of two conjugate surfaces as applicable to camera and projection lenses, telescope objectives, and like purposes. This system includes in its image-forming elements two or more mirrors having substantial power which cause the image-forming rays to undergo a reversal of their axial components at least three, and preferably four times, that is to say, the rays undergo a double excursion between primary and secondary elements. In its preferred embodiments, a ray proceeding from an object to an image plane is reflected at least twice by one of said mirrors.

Early two-mirror image-forming systems wereof the Cassegrain or Gregorian type in which conic sections were employed to eliminate spherical aberration. These systems achieve good resolution at the center of the image. In the Cassegrain type, for example, a concave parabola is used for the primary mirror, and a convex hyperbola is used for the secondary mirror. This pair of curves is but one member of a set of pairs, infinite in number, that can be employed to eliminate spherical aberration.

More refined designs have since been developed, the Schwarzchild and Ritchey-Cretian systems being examples. In these designs, advantage is taken of the possibility of selecting from members of the above described infinite sets of curves, a unique set of curves which, in addition to the elimination of spherical aberration, also eliminate primary coma by introducing the additional constraint that the Abbe sine condition must be observed. Given as initial conditions a first order solution of the powers and spacing of the two mirrors, these systems, in terms of the surfaces, are then uniquely defined. While the systems described are generally used with one conjugate at infinity, other examples may be found in the literature pertaining to systems where both conjugates are finite.

One of the most frequently-sought objectives in employing any of the above designs is to obtain a long focal length in a system of compact dimensions. However, it is found that when too heavy an emphasis is laid on compactness in such designs, the strength of the curves required enhances other aberrations, and also, the difficulties of manufacture increase substantially. For example, a parabola with a 200 inch diameter and 660 inch focal length, when employed with a hyperbolic secondary yielding an overall focal length of 3000 inches, can be said to have a field of view of unity based on some reasonable criterion of image degradation at the edge of the field. A Ritchey-Cretain aplanat, with the same first order parameters, and with the same degradation of image quality at the edge of the field, will have a field of view of 3 units. The aplanat design of the instant invention, with the same first order primary, will have a field of view of 5 units, and the distance between the mirrors, or the length of the system, will additionally be considerably reduced in length over the other examples.

Clearly, the above example makes it plain that a compromise exists between compactness of the device, and the field of view obtainable by it in the prior art. However, the single comparison given above shows that with this invention, a very substantial improvement can be made over the existing art as to both of these criteria. Furthermore, all of the conventional systems employ but a single excursion between primary and secondary elements. The relaxation of this constraint leads to new possibilities in the design of optical image-forming systems, and it is this feature which forms an important part of the instant invention.

The present invention provides means for preserving the aplanatic properties of a mirror-type image-forming system, while at the same time making substantial gains in the field of view obtainable in a system of compact dimensions.

This invention is carried out by providing a plurality of spherical or aspheric mirrors, in which the image-forming rays undergo a double excursion between primary and secondary elements.

According to a preferred but optional feature of this invention, a pair of aspheric mirrors is provided, one of which is impinged upon twice by the rays from the object.

According to still another preferred but optional feature of this invention, the elements of the device are so disposed and arranged as to transmit only rays emanating from the field of view, and to exclude, without further shielding, stray light from sources other than the object whose image is desired to be formed.

The above and other features of this invention will be fully understood from the following detailed description and the accompanying drawings in which:

FIG. 1 is an axial cross-section of an embodiment of the invention;

FIG. 2 is a left-hand view taken at line 2—2 of FIG. 1;

FIG. 3 is an axial cross-section of another embodiment of the invention;

FIGS. 4–6 are axial cross-sections of still other embodiments of the invention;

FIG. 7 is an axial cross-section of the presently preferred embodiment of the invention; and FIG. 8 is an axial cross-section of still another embodiment of the invention.

FIG. 1 shows a telescope system 10 which includes a primary mirror 11 having a reflecting surface 12, and a secondary mirror 13 with a reflecting surface 14. The system has a rentral axis 15. Entering rays 16 are reflected in paths 17, 18, 19 and 20, path 20 terminating at image plane 21 after passing through aperture 22 in mirror 11. It will be observed that only one set or rays on one side upon by paths 16 and 18, while the secondary mirror is impinged upon by paths 17 and 19. There therefore occur two impingements of the rays on each of the two mirrors. It will be observed that only one set or rays on one side of the axis has been shown, thereby to simplify the drawings.

As best shown in FIG. 1, the system is concentric around axis 15. The elements are held in position by structure which is entirely conventional, and need not be shown herein. Concentricity mounting as described for FIG. 1 is common to all of the other embodiments.

In order to define the shape and location of the mirrors, certain dimensions are given in FIG. 1 which are applicable to the shape and disposition of the mirrors in some of the other examples. Dimension A is the radius of the hole through the primary mirror. Dimension B is the radius of the primary mirror. Dimension C is the spacing between the central portions of the primary and secondary mirrors. Dimension D is the spacing between the image plane and the central point of the primary mirror, and Dimension E is the radius of the secondary mirror.

The shape of the mirrors is defined by reference to the Y and Z axes as shown by coordinates 22. Dimension U is the square of the length of the chord from the central point of the mirror to the point on the reflecting surface whose location is being defined. The shape of the mirrors is defined by the following equations:

$$Z = A_1 U + A_2 U^2 + A_3 U^3 + A_4 U^4 + \ldots \text{ where } U = Y^2 + Z^2$$

In this event, the shape of the reflecting surfaces of the mirror may be defined in terms of the coefficients $A_1$ through $A_4$. A numerical example of a suitable system according to FIG. 1 is as follows:

$A = 20.9$ mm.  $E = 25$ mm.
$B = 37.5$ mm.  $S = -.4$
$C = 125$ mm.  $T = -1.2$
$D = 32.39$ mm.

The coefficients are as follows:

Primary reflecting surface 12:
    $A_1$   $-6.6405 \times 10^{-4}$
    $A_2$   $+8.3226 \times 10^{-10}$
    $A_3$   $+5.5294 \times 10^{-16}$
    $A_4$   $-2.6470 \times 10^{-21}$ Secondary reflecting surface 14:
    $-6.6405 \times 10^{-4}$
    $+3.7303 \times 10^{-9}$
    $-6.5052 \times 10^{-15}$
    $-5.2940 \times 10^{-19}$ The equivalent focal length of this system is 600 mm. The foregoing numeral example specifies a system which can be employed as a telephoto lens and cover a frame dimension of 24 x 36 mm. which is a size popular for small 35 mm. cameras. This example is corrected for an object at infinity with the coefficients of the aspheric terms calculated to eliminate spherical aberration and coma. Similar examples may be calculated for an object of a finite distance or may be calculated in an optimum fashion for some distance intermediate between two desired extremes. This aspect is of practical significance, because a convenient focusing means is thereby attainable by making a small adjustment of the spacing between the mirrors, as contrasted with the larger excursions required if two mirrors were shifted as a unit. This latter is the normal practice in the prior art. For example, the distance C may be shortened by approximately 4 mm. which shifts the original infinite conjugate to a distance of 50 feet. By contrast, refocusing a conventional 600 mm. focal length lens from infinity to 50 feet would require a movement of the whole lens away from the image plane by 25 mm.

FIG. 2 illustrates that the reflective surfaces are complete and continuous surfaces of revolution in all of the systems are full. It will be understood that less than the entire surface of revolution could be provided, if desired. However, in all the examples given, the full reflective surface, or the full body of revolution (when lenses are provided), are utilized.

When demands for image quality are not excessive, a less expensive system which is fully analogous to FIG. 1 can be built. In such a system, the best spherical or conic section fit to the theoretically correct curves can be employed for surfaces 12 and 14. For example, primary mirror 12 could have a radius of 2.00 inches and secondary mirror 14 a radius of 2.15 inches, spaced apart by a distance of 0.25 inch, with a back focus of 0.75 inch. This provides a very suitable system, but the image quality is not as good as that described above in which more complex curves are utilized.

FIG. 3 illustrates another example according to the invention. In this embodiment, a lens 25 is placed ahead of a primary mirror 26 and a secondary mirror 27. They mirrors have reflecting surfaces 28 and 29, respectively. The system may conveniently have the following curvatures, the respective radii being shown in the drawings (dimensions in millimeters):

| | | |
|---|---|---|
| $r_1 = 275$ | $t_1\ 10.0$ | $N = 1.51723$ ⎫ —Lens 25 |
| $r_2 = 285$ | $t_2\ 160$ | $V = 64.5$ ⎭ |
| $r_3 = 1153.85$ | | EFL = 600 mm.; f/8 |
| $r_4 = 1886.27$ | $t_3\ 150$ | Spherical −.0013; t = −.66 |
| B.F. = 45.77 | | s = +.05; comma = −.038 |

The advantage of utilizing lens 25 is that all the surfaces may be spherical. The secondardy and its supporting shell (not shown) can be moved forward as a unit by 6.4 mm. to change the infinite object distance to 50 feet. It will be noted that entering rays 30 pass through lens 25 and then along path 31 to impinge on the primary mirror. Thereafter the reflections are in paths 32, 33, 34 and 35, path 35 impinging on the image plane 36 after passing through aperture 37 in mirror 26. Again, there are two impingements on each of the mirrors.

FIG. 4 illustrates a device providing an erect image, wherein a primary mirror 40 receives rays through annular opening 41 in a secondary mirror 42. The secondary mirror thereby has a central region 43 and an outer annular region 44. Entering rays 45 impinge on the primary mirror and then follow paths 46, 47, 48 and 49 to image plane 50 after passing through aperture 51. It will be noted that paths 40 and 42 impinge on the primary mirror, and paths 41 and 43 impinge on the secondary mirror. Such a system will have an erect image. Mirror 44 is preferably a second-surface reflector, with the reflecting surface 52 contiguous to the glass on the side opposite from mirror 40. Mirror 40 bears a reflecting surface 53 on its side facing mirror 44. Note that the rays cross the axis in path 47.

FIG. 5 illustrates the use of second-surface reflecting mirrors exclusively instead of only first-surface reflecting mirrors, or a mixture of the two. This system has the same general construction as that of FIG. 1, except that primary mirror 60 has a reflecting surface 61 on its second surface instead of on its first surface, while secondary mirror 62 also has its reflecting surface 63 on its second face. The light paths between entering rays 64 and the image plane 65 are the same as those in FIG. 1 with the exception that there are refractive effects as the rays pass through the glass of the mirrors.

FIG. 6 illustrates the use of a primary mirror 70 and a secondary mirror 71 wherein the image plane 72 is disposed between the two mirrors instead of on the opposite side of the primary mirror from the secondary mirror. In this case, entering ray 73 impinges on the secondary mirror and is reflected on paths 74, 75 and 76 to the image plane. In this type of system, there is a plurality of impingements upon the primary mirror, but only a single impingement on the secondary mirror. This illustrates some of the versatility of the invention.

It will be noted that aspheric surfaces are employed for the two mirrors in FIG. 1. In general, aspheric surfaces are commercially avoided because their introduction increases the cost and difficulty of manufacture. However, in the present invention, it has been found that the deformation from a true spherical surface of best fit in many cases is so small that it is practical to employ selective deposition of the reflecting layer on a spherical substrate, thereby to manufacture these surfaces expeditiously and inexpensively. Aluminum is an excellent material to form the reflecting surface. However, it is not practical to evaporate sufficiently thick layers of aluminum without the surface becoming diffuse. This difficulty may be overcome by evaporatnig the principal substrate of selective thickness in silver, and then providing a thin uniform overlayer of aluminum. A differential thickness of the evaporated layer of 100 fringes has been obtained by this method. This process is not limited to silver and aluminum. Any other evaporably materials having the necessary substrate and reflective properties may be used instead.

There are, of course, additional refractive elements which may be employed in combination with the reflecting surfaces to produce improved image quality, whatever type of reflecting surfaces are employed. Well-known examples of these refractive elements have been described by Schmidt and by Maksukov. These additional refractive elements are well known and require no further discussion because their use is standard and forms no part of the invention.

FIG. 7 shows the presently preferred embodiment of the invention. It is a compact telephoto lens with a much smaller diameter and length than commonly-known telephoto lenses, and is capable of achieving superior results. It employs multiple reflections from one reflecting surface, and, in addition, is so proportioned and arranged that the reflecting elements act as baffles to exclude stray light. Also, this construction utilizes spherical surfaces, which are simple to form.

The system includes a first lens 90 having a reflecting surface 91 on its left-hand face in FIG. 7. Surface 91 is circular, and its diameter is less than that of the lens. This leaves a clear, annular lens region 92 around the outside.

Adjacent to the first lens, but spaced therefrom, there is a second lens 93. This lens has an annular reflecting surface 94 formed on its right-hand face.

A third lens 95 is spaced from the first two lenses. It has an annular reflecting surface 96 on its right-hand face, and an aperture 97 therethrough.

A shroud tube 98 fits in aperture 97, and extends along axis 99 toward the second lens. Within tube 98 there is fitted a fourth lens 100 and a fifth lens 101. All of the recited elements are concentric on axis 99. Image plane 102 is to the right of the fifth lens.

Entering rays 103 pass through lens region 92 and strike reflecting surface 96. They are reflected along path 104 to reflecting surface 94. They then proceed along path 105 to impinge upon surface 96 for the second time. From this second impingement, they proceed along path 106 to impinge upon surface 91, from which they proceed along path 107, through the fourth and fifth lenses, to the image plane.

Attention is called to the fact that surfaces 91, 94 and 96 are so disposed and arranged as to act as "venetian blind" type baffles which will exclude stray light from the image plane. The shroud tube is an optional additional element for this same purpose. Only the rays forming the desired image reach the image plane.

FIG. 8 constitutes substantially the same system as that of FIG. 7, but does illustrate certain optional features. For example, its primary mirror 110 has a pair of reflecting surfaces 111, 112 on opposite sides of the glass. The secondary mirror 113 also has reflecting surfaces 114, 115 on opposite sides of the glass, and, instead of utilizing two lenses in the secondary such as lenses 90 and 93 in FIG. 7, uses only one lens. Reflecting surfaces 111, 112 and 115 are annular. Surface 114 is circular.

The device of FIG. 8 also includes a shroud tube 116 and lenses 117, 118 inside it. The design of all surfaces and lenses in FIG. 8 is analogous to that of the corresponding portions in FIG. 7. Again, the reflecting surfaces act as "slats" to exclude stray light.

FIG. 8 also serves to indicate that the objectives of this invention—multiple excursions of light between the primary and secondary comprehends more than multiple reflections at the same surface. For example, in FIG. 8, the sequential paths are numbered 120–124 inclusive. Paths 120 and 122 impinge on the primary, and paths 121 and 123 on the primary in the sense of this invention, even though the surfaces themselves are located on opposite sides of the glass, or even, as in FIG. 7, between surfaces on different pieces of glass.

In FIG. 1, the excursions to the primary are paths 16 and 18; to the secondary, 17 and 19. The paths in FIG. 5 are identical except that the reflecting surfaces are on the opposite sides of the glass.

In FIG. 3, the excursions to the primary are paths 31 and 33; to the secondary, 32 and 34.

In FIG. 4, the excursions to the primary are paths 45 and 47; to the secondary 46 and 48.

In FIG. 6, the excursions to the primary are paths 73 and 75. There is only one excursion to the secondary path 74, this figure illustrating the provision of a multiple excursion to only one of the reflecting elements.

In FIG. 7, the excursions to the primary are paths 103 and 105; to the secondary, paths 104 and 106.

The term "primary" is used herein in the sense of a reflecting element that has a substantial image-forming power (compared to a plane), which reverses the direction of the axial component of the ray. There may be, and in FIGS. 7 and 8 there are, more than one "primary" reflecting surface. The term "secondary" is similarly used, but is for elements which tend to restore the axial component to its original direction.

This invention thereby provides a wider field of the same definition for telescopes in the same overall envelope dimensions as prior art telescopes, or may provide the same field, but in a more compact envelope. This invention thereby provides an entirely new technique for development of large telescopes and also provides means to make lenses, such as telephoto lenses of extreme compactness.

The advantages of this system is that by breaking the two secondary reflections into different surfaces, it is possible to prevent any direct light, or light arriving by single reflections, to impinge on the focal surface. By this means, stray light is eliminated.

In all embodiments, at least one of the reflecting surfaces may be axially shiftable relative to the other. The term "reflecting surface" is used interchangeably with the word "mirror," and the primary and secondary reflecting surfaces may be regarded as primary and secondary mirrors.

This invention is not to be limited by the embodiments shown in the drawings and described in the description which are given by way of example and not of limitation, but only in accordance with the scope of the appended claims.

I claim:

1. An image-forming system comprising a concave primary reflecting surface and a convex secondary reflecting surface with said surfaces facing each other, the primary reflecting surface being so disposed and arranged relative to a field of view as to receive rays therefrom, and the reflecting surfaces being so disposed and arranged relative to each other along an optical axis, and having such curvatures, as to cause the rays to be reflected twice from each reflecting surface, said reflecting surfaces being aspheric and formed to eliminate both spherical aberration and coma, said reflecting surfaces having a shape defined by the following equation:

$$z = A_1 U + A_2 U^2 + A_3 U^3 + A_4 U^4 + \ldots A_n U^n$$

where U is the square of the chord from the midpoint of the reflecting surface to the defined point, $z$ is the axial displacement of the defined point and $A_1, A_2, A_3, A_4 \ldots A_n$ are constants, and in which the constants are as given in the table below:

Primary reflecting surface:
$A_1$ $-6.6405 \times 10^{-4}$
$A_2$ $+8.3226 \times 10^{-4}$
$A_3$ $+5.5294 \times 10^{-16}$
$A_4$ $-2.6470 \times 10^{-21}$ Secondary reflecting surface:
$-6.6405 \times 10^{-4}$
$+3.7303 \times 10^{-9}$
$-6.5052 \times 10^{-15}$
$-5.2940 \times 10^{-19}$ 2. An image-forming system according to claim 1 in which the spacing between the reflecting surfaces is adjustable.

References Cited

UNITED STATES PATENTS

| | | | |
|---|---|---|---|
| 2,485,345 | 10/1949 | Ackerman | 350—201 |
| 3,064,526 | 11/1962 | Lindsay | 350—199 |
| 3,001,446 | 9/1961 | Bouwers et al. | 350—199 |
| 3,119,892 | 1/1964 | Shenker | 350—199 |

DAVID SCHONBERG, Primary Examiner

R. J. STERN, Assistant Examiner

U.S. Cl. X.R.

350—200, 201